(12) United States Patent
Roach

(10) Patent No.: US 9,102,353 B2
(45) Date of Patent: Aug. 11, 2015

(54) MOUNTING ARRANGEMENT FOR STEERING PUMP

(71) Applicant: Caterpillar Inc., Peoria, IL (US)

(72) Inventor: Keegan W. Roach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/279,656

(22) Filed: May 16, 2014

(65) Prior Publication Data

US 2014/0246557 A1 Sep. 4, 2014

(51) Int. Cl.
| | |
|---|---|
| *H02K 5/00* | (2006.01) |
| *B62D 1/20* | (2006.01) |
| *B62D 1/02* | (2006.01) |
| *B62D 3/02* | (2006.01) |
| *B62D 3/14* | (2006.01) |
| *B62D 5/093* | (2006.01) |

(52) U.S. Cl.
CPC .. *B62D 1/20* (2013.01); *B62D 1/02* (2013.01); *B62D 3/02* (2013.01); *B62D 3/14* (2013.01); *B62D 5/093* (2013.01)

(58) Field of Classification Search
CPC .............. B62D 1/02; B62D 3/12; B62D 3/14; B62D 3/02

USPC .............. 310/51, 71, 91, 67 R; 180/400, 292, 180/300; 248/560
See application file for complete search history.

(56) References Cited

U.S. PATENT DOCUMENTS

| | | | | |
|---|---|---|---|---|
| 4,647,803 | A | * | 3/1987 | von der Heide et al. ........ 310/51 |
| 5,942,821 | A | * | 8/1999 | Shin ............................. 310/67 R |
| 7,015,605 | B1 | * | 3/2006 | Peter et al. ....................... 310/51 |

* cited by examiner

*Primary Examiner* — Todd M Epps

(57) ABSTRACT

A mounting arrangement for a steering pump assembly of a vehicle is disclosed. The mounting arrangement includes a mounting plate coupled to a floorboard of the vehicle. A top plate is disposed above the mounting plate and a bottom plate is disposed below the mounting plate. The mounting plate, top plate and bottom plate include a first, second, and third apertures, respectively, which are in alignment with one another along a pump axis. A first, second, and third openings of the mounting plate, top plate and bottom plate, respectively, are in alignment with one another. A tubal isolation mount is located within first opening of the mounting plate. A fastener extends through each isolation mount, each second and third opening and a body of the steering pump assembly. A sealing member is provided between the top plate and the mounting plate.

2 Claims, 6 Drawing Sheets

MOUNTING ARRANGEMENT FOR STEERING PUMP

TECHNICAL FIELD

The present disclosure relates to a steering system for a vehicle, and more particularly to a mounting arrangement for a steering pump assembly of the steering system.

BACKGROUND

A typical power steering system used with a vehicle includes a steering pump assembly coupled with a steering column. The steering pump assembly is generally mounted on a lower surface of an operator cab of the vehicle. For the purpose of servicing and/or maintenance of the steering pump assembly, the steering pump assembly has to be dismantled from the operator cab. Removing the steering pump assembly from bottom of the operator cab is space constrained and challenging for service personnel. To avoid such situations, the steering pump assembly is mounted on a floorboard of the operator cab such that the steering pump assembly may be removed and pulled up from within the operator cab.

The aforesaid mounting arrangement may transmit vibrations from the vehicle structure into the operator cab of the vehicle. To prevent this, the steering pump is mounted on the floorboard of the operator cab with vibration absorbing or dampening member. However, such an arrangement may allow entry of ambient air and/or noise through the floorboard into the operator cab.

SUMMARY OF THE DISCLOSURE

In an aspect of the present disclosure, a mounting arrangement for a steering pump assembly of a vehicle is provided. The mounting arrangement includes a mounting plate configured to be releasably coupled to a floorboard of the vehicle. The mounting plate has a first aperture and a plurality of first openings formed therein. A top plate is spaced apart and disposed above the mounting plate. The top plate has a second aperture and a plurality of second openings formed therein. A bottom plate is spaced apart and disposed below the mounting plate. The bottom plate has a third aperture and a plurality of third openings formed therein. The first, second, and third apertures are in alignment with one another along a pump axis and configured to receive a pump adapter of the steering pump assembly. The first, second, and third openings are in alignment with one another and spaced from the pump axis. The mounting arrangement further includes a tubal isolation mount located within each first opening of the mounting plate. A fastener extends through each isolation mount and each second and third opening of the corresponding plates to secure the top plate, the bottom plate, and a body of the steering pump assembly to be downwardly suspended below the floorboard. The mounting arrangement further includes a sealing member provided between the top plate and the mounting plate and portions of the sealing member are configured to surround each isolation mount and the pump adaptor. When the fasteners are placed in a secured configuration, upper and lower portions of each isolation mount extend beyond a cross-sectional area of the first opening of the mounting plate and disposed between the mounting plate and the respective top plate and the bottom plate.

In another aspect of the present disclosure, a mounting arrangement for a steering pump assembly of a vehicle is provided. The mounting arrangement includes a mounting plate configured to be releasably coupled to a floorboard of the vehicle. The mounting plate has a first aperture and a plurality of first openings formed therein. A top plate is spaced apart and disposed above the mounting plate. The top plate has a second aperture and a plurality of second openings formed therein. A bottom plate is spaced apart and disposed below the mounting plate. The bottom plate has a third aperture and a plurality of third openings formed therein. The first, second, and third apertures are in alignment with one another along a pump axis and configured to receive a pump adapter of the steering pump assembly. The first, second, and third openings are in alignment with one another and spaced from the pump axis. The mounting arrangement further includes a tubal isolation mount located within each first opening of the mounting plate. A fastener extends through each isolation mount and each second and third opening of the corresponding plates to secure the top plate, the bottom plate, and a body of the steering pump assembly to be downwardly suspended below the floorboard. The mounting arrangement further includes a sealing member provided between the top plate and the mounting plate and portions of the sealing member are configured to surround each isolation mount and the pump adaptor. When the fasteners are placed in a secured configuration, upper and lower portions of each isolation mount extend beyond a cross-sectional area of the first opening of the mounting plate and disposed between the mounting plate and the respective top plate and the bottom plate. The mounting arrangement further includes a sealant applied on outer surface of the pump adapter to seal a clearance formed between the pump adapter and the mounting plate, the top plate and the bottom plate. A handling member is provided on the mounting plate to remove the steering pump assembly along with the mounting arrangement thereof from inside of an operator cab.

Other features and aspects of this disclosure will be apparent from the following description and the accompanying drawings.

DETAILED DESCRIPTION

Figure 1:
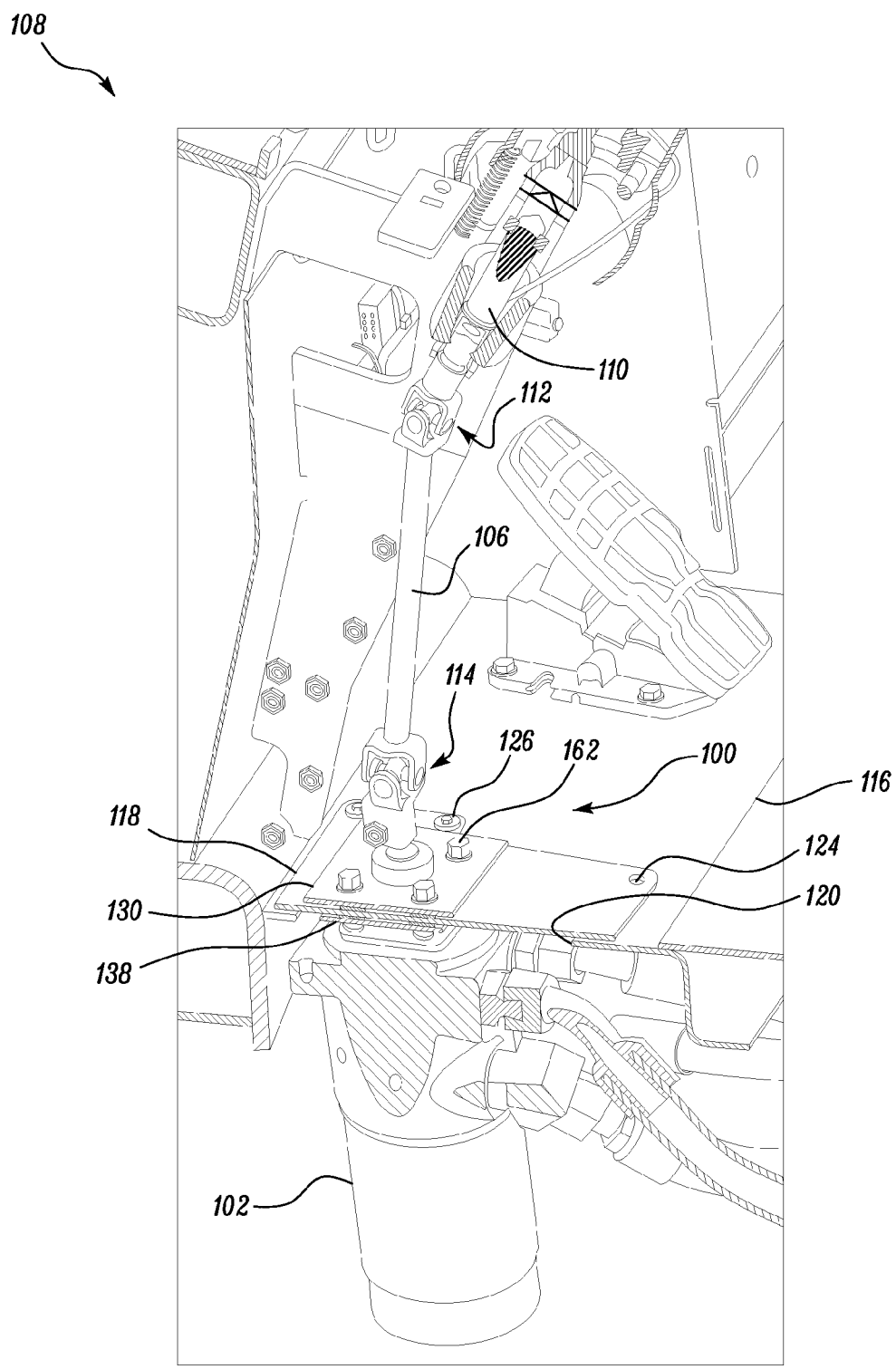
FIG. 1 illustrates a sectional perspective view of a mounting arrangement of a steering pump assembly with a floorboard of an operator cab, according to an embodiment of the present disclosure.

FIG. 1 shows a sectional perspective view of a mounting arrangement 100 of a steering pump assembly 102 of a vehicle (not shown), according to an embodiment of the present disclosure. The mounting arrangement 100 is disposed in the operator cab 108 of the vehicle. The vehicle may include any vehicle that may be used for the purpose of construction, mining, quarrying, agriculture, and so on. The vehicle may also include earthmoving vehicles or off-highway vehicles that are provided with a work implement for performing various operations. The steering pump assembly 102 is associated with a steering assembly of the vehicle. The steering pump may be such as, for example, a tandem pump, rotary pump, and the like. As shown in FIG. 1, the steering pump assembly 102 is operatively coupled with a steering column 106 of a steering wheel (not shown). The steering wheel may be connected to a rod 110 that is adapted to receive a first universal joint 112. The first universal joint 112 may be further coupled with one end of the steering column 106. Another end of the steering column 106 is adapted to receive a second universal joint 114. The steering pump assembly 102 is operatively coupled with the second universal joint 114 inside the operator cab 108.

The operator cab 108 may include various control members for controlling the movement of the vehicle such as, for example, accelerator pedal, brake pedal, clutch pedal, and the like. The operator cab 108 includes a floorboard 116 for enclosing the operator cab 108 from bottom thereof. The floorboard 116 is adapted to operatively support the brake pedal, clutch pedal and accelerator pedal. The steering pump assembly 102 associated with the steering assembly may be removably mounted on a lower surface of the floorboard 116.

The detailed mounting arrangement 100 of the steering pump assembly 102 is described hereinafter in detail. The mounting arrangement 100 includes a mounting plate 118 that is configured to be releasably coupled to the floorboard 116 of the vehicle. As shown in FIG. 1, the mounting plate 118 may define a circumferential shape that is configured to completely cover a slot 120 defined by the floorboard 116. A size of the slot 120 may be such that the steering pump assembly 102 passes therethrough. The mounting plate 118 also includes a plurality of openings 124. The plurality of openings 124 is provided adjacent to edges of the mounting plate 118 for releasably coupling the mounting plate 118 with the floorboard 116 via fastening members 126. The fastening members 126 may be a bolt and nut arrangement. Further, the mounting arrangement 100 includes a top plate 130. The top plate 130 is disposed above the mounting plate 118.

Figure 2:
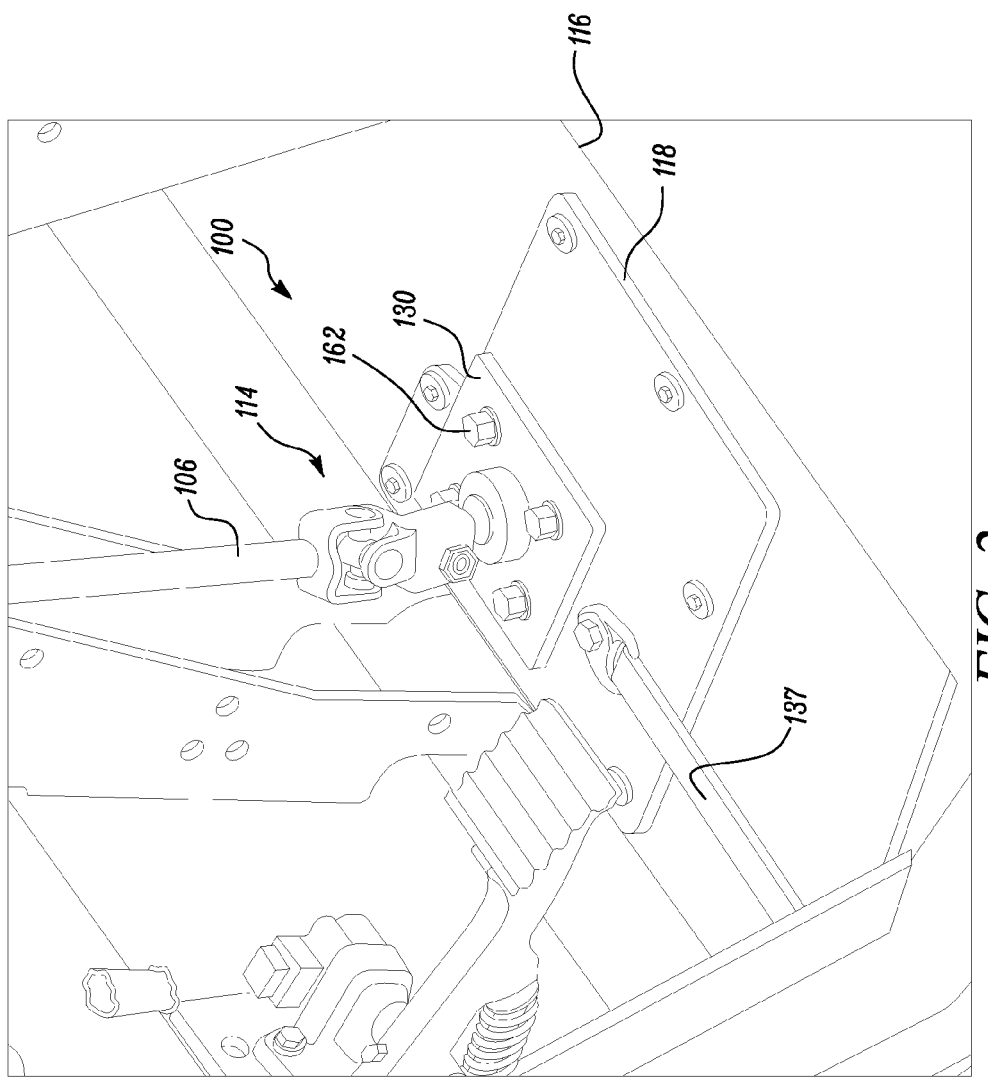
FIG. 2 shows a top perspective view of the mounting arrangement of the steering pump assembly of FIG. 1.

FIG. 2 shows a top perspective view of the mounting arrangement 100. A handling member 137 may be coupled with the mounting plate 118. The handling member 137 may be a pull strap, a chain, a metallic handle and alike. The handling member 137 may be used by an operator for holding the mounting plate 118 and remove it from the floorboard 116 from within the operator cab 108 along with the steering pump assembly 102. The mounting arrangement 100 further includes multiple fasteners 162. The fasteners 162 may affix various components of the mounting arrangement 100 including the top plate 130 and the mounting plate 118 to the steering pump assembly 102. Each of the fasteners 162 may be a stud or a bolt and nut arrangement.

Figure 3:
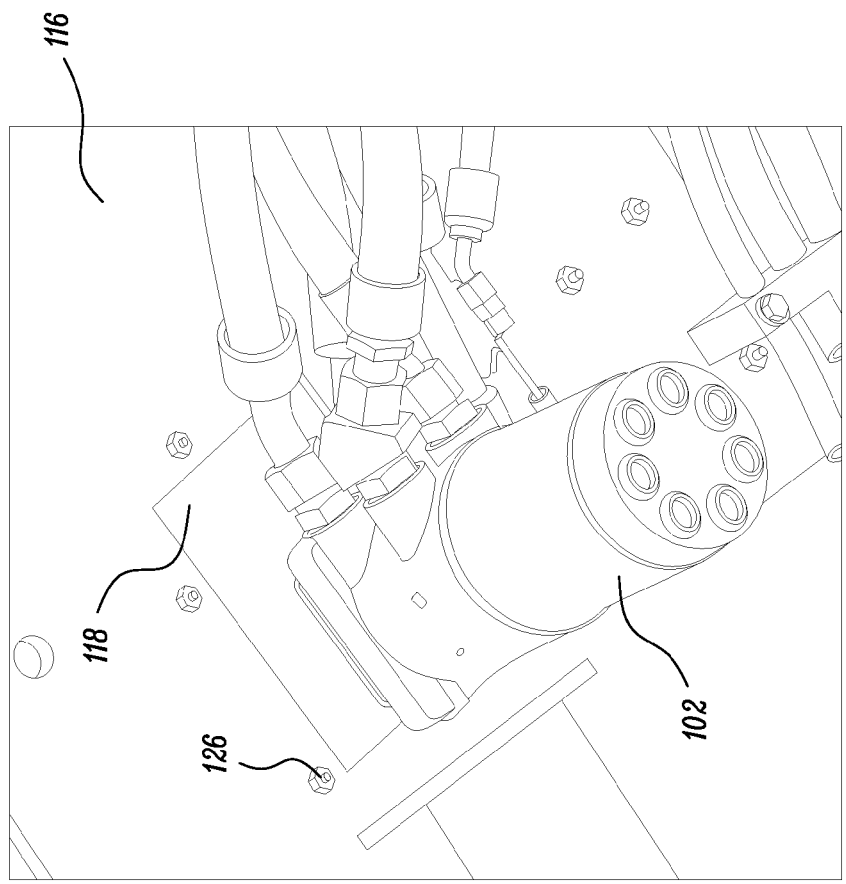
FIG. 3 shows a bottom perspective view of the mounting arrangement of the steering pump assembly of FIG. 1.

FIG. 3 shows a bottom perspective view of the mounting arrangement 100. As shown in FIG. 3, the mounting arrangement 100 further includes a bottom plate 138. The bottom plate 138 is disposed below the mounting plate 118.

Figure 4:
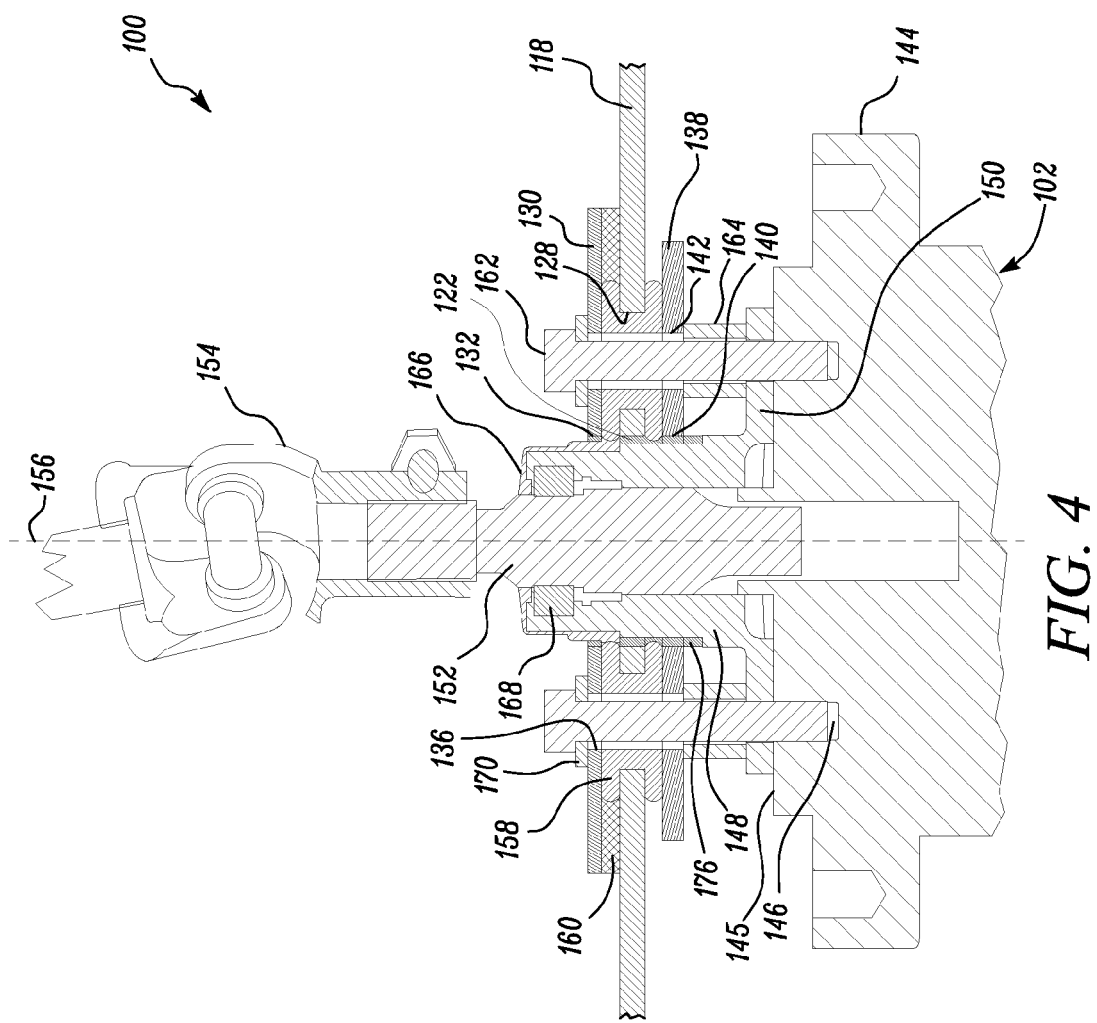
FIG. 4 illustrates a sectional view of the mounting arrangement of the steering pump assembly with the floorboard of the operator cab, according to an embodiment of the present disclosure.

FIG. 4 illustrates a sectional view of the mounting arrangement 100 of the steering pump assembly 102 with the floorboard 116 (shown in FIG. 1), according to an embodiment of the present disclosure. The mounting arrangement 100 includes the mounting plate 118 that has a first aperture 122. The first aperture 122 may be circular in cross section. The mounting plate 118 further includes a plurality of first openings 128. The first openings 128 are spaced apart from the first aperture 122. The top plate 130 has a second aperture 132. The second aperture 132 may be in circular cross section. The top plate 130 also includes a plurality of second openings 136. The plurality of second openings 136 may be aligned with the corresponding first openings 128. The bottom plate 138 includes a third aperture 140 aligned with the first aperture 122 of the mounting plate 118 and the second aperture 132 of the top plate 130. In an embodiment, the first, second and third apertures 122, 132, 140 may have substantially similar cross-sections. The bottom plate 138 also includes a plurality of third openings 142 aligned with the corresponding second openings 136 of the top plate 130 and the corresponding first openings 128 of the mounting plate 118.

The steering pump assembly 102 includes a body 144 having a top surface 145 provided with a plurality of openings 146. The steering pump assembly 102 further includes a pump adapter 148. The pump adaptor 148 may be a hollow cylindrical body having a bottom end provided with a flange 150. The flange 150 may be removably mounted on the top surface 145 of the body 144. The flange 150 is also provided with a plurality of openings (not shown) corresponding to the plurality of openings 146 provided in the top surface 145 of the body 144. The steering pump assembly 102 further includes an input shaft 152 that is rotatably received through the pump adapter 148 and operatively coupled to the body 144 of the steering pump assembly 102. The top end of the input shaft 152 is provided with a coupling member 154 configured to receive the second universal joint 114 (shown in FIG. 1). The input shaft 152 has a central axis which hereinafter referred as 'the pump axis 156'. Upon receipt of input from the steering wheel via the steering column 106, the input shaft 152 actuates the steering pump assembly 102 to supply the pressurized fluid to the hydraulic cylinders associated with ground engaging members (e.g., wheels) of the vehicle.

The first aperture 122 of the mounting plate 118, the second aperture 132 of the top plate 130 and the third aperture 140 of the bottom plate 138 are in alignment with one another along the pump axis 156 and configured to at least partly receive the pump adapter 148 of the steering pump assembly 102. The plurality of first openings 128 in the mounting plate 118, the plurality of second openings 136 in the top plate 130 and the plurality of third openings 142 in the bottom plate 138 are also in alignment with one another and spaced from the pump axis 156.

The mounting arrangement 100 further includes a tubal isolation mount 158. The tubal isolation mount 158 may be a hollow cylindrical body made from elastic material, such as rubber. The isolation mount 158 is located within each of the plurality of first openings 128 of the mounting plate 118 and positioned between the corresponding plurality of second and third openings 136, 142 of the top plate 130 and the bottom plate 138, respectively. The mounting arrangement 100 further includes a sealing member 160 disposed between the top plate 130 and the mounting plate 118. The sealing member 160 may be have an outer circumference substantially similar to an outer circumference of the top plate 130. The sealing member 160 is also provided with a plurality of openings (not shown) corresponding to the plurality of first openings 128 of the mounting plate 118 and an aperture corresponding to the first aperture 122 of the mounting plate 118. Each of the plurality of openings provided in the sealing member 160 is adapted to receive each of the isolation mounts 158 therethrough. Hence, the sealing member 160 surrounds each isolation mount 158 and the pump adapter 148 in an assembled configuration of the mounting arrangement 100.

Each of the fasteners 162 may define a length that is configured to extend from the openings 146 of the body 144 and through the second openings 136 of the top plate 130, the isolation mounts 158, and the third openings 142 of the bottom plate 138. The mounting arrangement 100 also includes a spacer 164. The spacer 164 may be a hollow cylindrical body extending between the bottom plate 138 and the flange 150 of the pump adapter 148. An inner diameter of the spacer 164 is adapted to receive the fastener 162 therethrough. The length of the spacer 164 and the fastener 162 may be varied to adjust a mounting position of the steering pump assembly 102 along the pump axis 156 with respect to the floorboard 116 of the operator cab 108 (shown in FIG. 1). A sealing cover 166 is disposed on top of the pump adapter 148. The sealing cover 166 may restrict flow of foreign material (e.g., dust, water, etc.) into a bearing 168 that is disposed between the input shaft 152 and the pump adapter 148.

In an embodiment of the present disclosure, a sealant 176 may be applied on outer surface of the pump adapter 148. The amount of sealant 176 that is applied on the outer surface of the pump adapter 148 may be sufficient to seal a clearance formed between the pump adapter 148 and at least one of the top plate 130, the mounting plate 118 and the bottom plate 138. The sealant 176 may restrict entry of air, dust, etc. into the operator cab 108.

Figure 5:
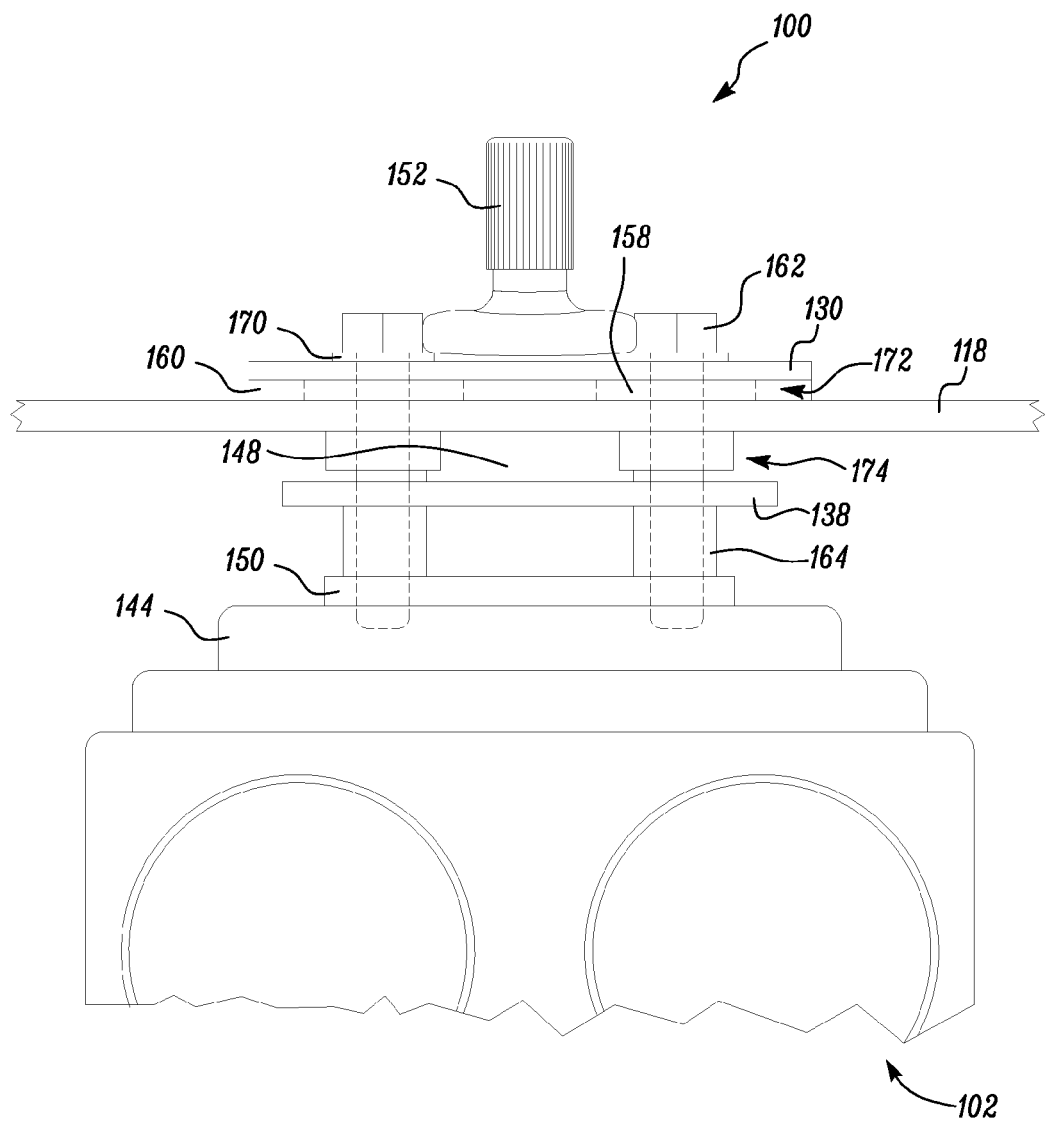
FIG. 5 illustrates the mounting arrangement of the steering pump assembly with the floorboard of the operator cab before tightening with a fastener, according to an embodiment of the present disclosure.

FIG. 5 illustrates the mounting arrangement 100 of the steering pump assembly 102 with the floorboard 116 of the operator cab 108 before tightening the fasteners 162, according to an embodiment of the present disclosure. The assembly of the mounting arrangement 100 is described hereinafter in detail. The mounting plate 118 is releasably coupled with the floorboard 116 of the operator cab 108 via the fastening members 126 (shown in FIG. 1). The tubal isolation mount 158 may be press fitted into each of the plurality of first openings 128 of the mounting plate 118. The sealing member 160 may be then disposed on top of the mounting plate 118. Each of the plurality of openings of the sealing member 160 may be aligned with each of the isolation mount 158. The top plate 130 may be then mounted on the sealing member 160. Subsequently, the fasteners 162 are inserted through each of the plurality of second openings 136 of the top plate 130. Washers 170 may be provided between the fasteners 162 and the top plate 130. The bottom plate 138 may be inserted through the fastener 162 from the lower surface of the floorboard 116 followed by providing the spacers 164 around the fasteners 162. The steering pump assembly 102 may be then mounted on to the aforesaid arrangement by inserting the pump adapter 148 through a continuous passage formed by the first, second and third apertures 122, 132, 140 apertures (shown in FIG. 4), and the aperture of the sealing member 160. Thus, the steering pump assembly 102 is downwardly suspended below the floorboard 116 of the operator cab 108. In an embodiment, the isolation mount 158 may be substantially cylindrical in an original state. However, due to a weight of the steering pump assembly 102, an upper portion 172 of the isolation mount 158 defined between the top plate 130 and the mounting plate 118 may deform so as to extend beyond the cross-sectional area of the first opening 128 (shown in FIG. 4) of the mounting plate 118.

Figure 6:
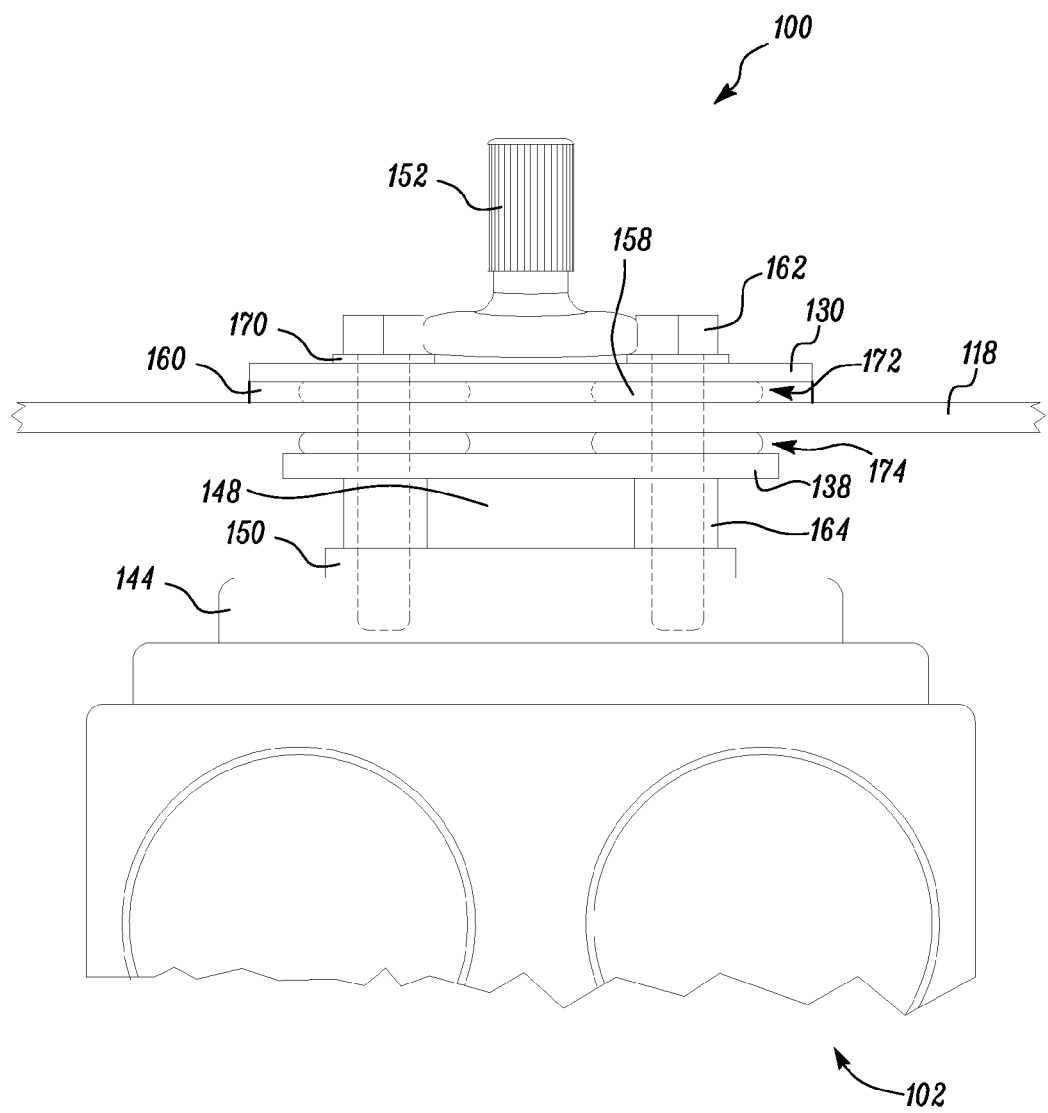
FIG. 6 illustrates the mounting arrangement of the steering pump assembly with the floorboard of the operator cab of FIG. 5 after tightening with the fastener.

FIG. 6 illustrates the mounting arrangement 100 of the steering pump assembly 102 with the floorboard 116 of the operator cab 108 after tightening the fasteners 162. After the complete assembly of the mounting arrangement 100, with reference to FIG. 5 above, a torque is applied on the fasteners 162 via tools such as, for example, torque wrenches. When the fasteners 162 are tightened, the upper portion 172 of the isolation mount 158 and a lower portion 174 of the isolation mount 158 defined between the mounting plate 118 and the bottom plate 138 deform so as to extend beyond the cross-sectional area of the first openings 128 of the mounting plate 118.

INDUSTRIAL APPLICABILITY

The present disclosure is related to the mounting arrangement 100 of the steering pump assembly 102 of the vehicle. The mounting plate 118 and the plurality of openings 124 corresponding to the openings in the floorboard 116 of the mounting arrangement 100 may be configured to allow the entire subassembly of the steering pump assembly 102, the pump adapter 148, the top and bottom plates 130, 138, the tubal isolation mounts 158, the washers 170, the sealing member 160, the spacers 164, and the fasteners 162 to be assembled or serviced as a subassembly while separated from the floorboard 116. Furthermore, even in cases where the steering pump assembly 102 is mounted on an angle or horizontally, this mounting arrangement 100 may allow the assembler or service person to orient the subassembly of the steering pump assembly 102, the pump adapter 148, the top and bottom plates 130, 138, the tubal isolation mounts 158, the washers 170, the sealing member 160, the spacers 164, and the fasteners 162 such that the steering pump assembly 102 is hanging vertically below the mounting plate 118 during assembly or service. This ability to separate and re-orient the subassembly, with the steering pump assembly 102 down, may assist with assembly and service, because in that orientation the weight of the steering pump assembly 102 assists in maintaining pressure on a top side of the tubal isolation mounts 158. Therefore, the mounting arrangement 100 of the steering pump assembly 102, the pump adapter 148, the top and bottom plates 130, 138, the tubal isolation mounts 158, the washers 170, the sealing member 160, the spacers 164, and the fasteners 162 can be more easily assembled or serviced on vehicles where the floorboard 116 is not parallel to the ground, including cases where the steering pump assembly 102 is mounted to a front of the operator cab 108 rather than the bottom.

In the present disclosure, the tubal isolation mount 158 disposed between the top plate 130 and the mounting plate 118 may prevent transmission of vibrations generated from structure of the vehicle. The isolation mount 158 also helps in preventing the transmission of vibrations to the steering pump 102 and the steering wheel. There may be a possibility of clearance in the range of $1mm$ to $2mm$ between the pump adapter 148, and the mounting plate 118, the top plate 130 and the bottom plate 138. Entry of dust, water, ambient air through this clearance into the operator cab 108 may be prevented by the sealing member 160 as the sealing member 160 deforms from its original shape and tightly abuts the pump adapter 148. The sealant 176 disposed on the outer surface of the pump adapter 148 may further restrict entry of ambient air, dust etc. into the operator cab 108. Thus the tubal isolation mount 158 together with the sealing member 160 and the sealant 176 may provide an airtight seal between the floor board 116 and the mounting arrangement 100 of the steering pump assembly 102 to restrict entry of ambient air, dust, noise etc. into the operator cab 108.

While aspects of the present disclosure have been particularly shown and described with reference to the embodiments above, it will be understood by those skilled in the art that various additional embodiments may be contemplated by the modification of the disclosed vehicles, systems and methods without departing from the spirit and scope of what is disclosed. Such embodiments should be understood to fall within the scope of the present disclosure as determined based upon the claims and any equivalents thereof.

What is claimed is:

1. A mounting arrangement for a steering pump assembly of a vehicle, the mounting arrangement comprising:
 a mounting plate configured to be releasably coupled to a floorboard of the vehicle, the mounting plate having a first aperture and a plurality of first openings formed therein;
 a top plate spaced apart and disposed above the mounting plate, the top plate having a second aperture and a plurality of second openings formed therein;
 a bottom plate spaced apart and disposed below the mounting plate, the bottom plate having a third aperture and a plurality of third openings formed therein, wherein the first, second, and third apertures are in alignment with one another along a pump axis and configured to receive a pump adapter of a steering pump, wherein the first, second, and third openings are in alignment with one another and spaced from the pump axis;
 a tubal isolation mount located within each first opening of the mounting plate;
 a fastener extending through each isolation mount and each second opening third opening of the corresponding plates to secure the top plate, the bottom plate, and a body of the steering pump to be downwardly suspended below the floorboard; and
 a sealing member provided between the top plate and the mounting plate, wherein portions of the sealing member are configured to surround each isolation mount and the pump adaptor, wherein, when the fasteners are placed in a secured configuration, upper and lower portions of each isolation mount extend beyond a cross-sectional area of the first opening of the mounting plate and disposed between the mounting plate and the respective top plate and the bottom plate.

2. A mounting arrangement for a steering pump assembly of a vehicle, the mounting arrangement comprising:
 a mounting plate to be releasably coupled to a floorboard of the vehicle, the mounting plate having a first aperture and a plurality of first openings formed therein;
 a top plate spaced apart and disposed above the mounting plate, the top plate having a second aperture and a plurality of second openings formed therein;
 a bottom plate spaced apart and disposed below the mounting plate, the bottom plate having a third aperture and a plurality of third openings formed therein, wherein the first, second, and third apertures are in alignment with one another along a pump axis and configured to receive a pump adapter of a steering pump, wherein the first, second, and third openings are in alignment with one another and spaced from the pump axis;
 a tubal isolation mount located within each of the plurality of first opening of the mounting plate;
 a fastener extending through each isolation mount and each second opening third opening of the corresponding plates to secure the top plate, the bottom plate, and a body of the steering pump to be downwardly suspended below the floorboard;
 a sealing member provided between the top plate and the mounting plate, wherein portions of the sealing member are configured to surround each isolation mount and the pump adaptor; wherein, when the fasteners are placed in a secured configuration, upper and lower portions of each isolation mount extend beyond the cross-sectional area of the first opening of the mounting plate and disposed between the mounting plate and the respective top plate and the bottom plate;
 a sealant applied on outer surface of the pump adapter to seal a clearance formed between the pump adapter and the mounting plate, the top plate and the bottom plate; and
 a handling member provided on the mounting plate to remove the steering pump assembly along with the mounting arrangement thereof from inside of an operator cab.

* * * * *